(12) United States Patent
Lee

(10) Patent No.: US 7,466,895 B2
(45) Date of Patent: Dec. 16, 2008

(54) METHOD OF DISPLAYING, SELECTING AND MAGNIFYING MULTIPLE MICRO-IMAGES, AND DISPLAY DEVICE AND PORTABLE TERMINAL USING THE SAME

(75) Inventor: Sang-goog Lee, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 48 days.

(21) Appl. No.: 11/390,380

(22) Filed: Mar. 28, 2006

(65) Prior Publication Data

US 2006/0228091 A1  Oct. 12, 2006

(30) Foreign Application Priority Data

Apr. 6, 2005  (KR) .................. 10-2005-0028685

(51) Int. Cl.
*G02B 6/00* (2006.01)
(52) U.S. Cl. ................. 385/147; 455/566; 345/7; 359/434
(58) Field of Classification Search ............ 455/566; 359/49, 434; 345/7; 385/147
See application file for complete search history.

(56) References Cited

U.S. PATENT DOCUMENTS 5,142,387 A * 8/1992 Shikama et al. ............. 349/9
6,073,034 A * 6/2000 Jacobsen et al. ............. 455/566
6,085,112 A * 7/2000 Kleinschmidt et al. ... 455/556.1
6,323,892 B1  11/2001 Mihara ..................... 348/14.01
6,452,577 B1  9/2002 Gale et al. .................... 345/87
7,225,409 B1* 5/2007 Schnarel et al. ............. 715/747
2002/0145573 A1* 10/2002 Cheng ............................ 345/7

FOREIGN PATENT DOCUMENTS

| JP | 5-064183 | 3/1993 |
|---|---|---|
| JP | 2000-059853 | 2/2000 |
| JP | 2001-217908 | 8/2001 |
| JP | 2003-101621 | 4/2003 |
| KR | 10-1999-0035264 | 5/1999 |
| KR | 10-2002-0088016 | 11/2002 |
| KR | 10-2003-0096783 | 12/2003 |
| KR | 10-2004-0051202 | 6/2004 |

* cited by examiner

*Primary Examiner*—K. Cyrus Kianni
*Assistant Examiner*—Guy G Anderson
(74) *Attorney, Agent, or Firm*—Staas & Halsey LLP

(57) ABSTRACT

A method of displaying, selecting and magnifying multiple micro-images, and a display device and portable terminal using the method. A display device for displaying, selecting and magnifying multiple micro-images, includes: a concave reflector having a radius of curvature and a focal distance; multiple display panels, arranged within the focal distance, displaying the multiple micro-images toward the concave reflector; and a corner-image interrupter, interposed between the multiple display panels and the concave reflector, interrupting a distorted portion of a magnified image generated when one of the micro-images displayed on a display panel is reflected by corners of the concave reflector.

13 Claims, 8 Drawing Sheets

<Cross-sectional view when viewing from front>   <Cross-sectional view when viewing from rear>

METHOD OF DISPLAYING, SELECTING AND MAGNIFYING MULTIPLE MICRO-IMAGES, AND DISPLAY DEVICE AND PORTABLE TERMINAL USING THE SAME

CROSS-REFERENCE TO RELATED APPLICATION

This application claims priority from Korean Patent Application No. 10-2005-0028685 filed on Apr. 6, 2005, in the Korean Intellectual Property Office, the disclosure of which is incorporated herein by reference.

BACKGROUND OF THE INVENTION

1. Field of the Invention

The present invention relates to a method of displaying, selecting and magnifying multiple micro-images, and a display device and portable terminal using the same, and more particularly to a method of displaying, selecting and magnifying multiple micro-images, and a display device and portable terminal using the same, which can output the multiple micro-images to multiple display panels, compensate for distorted parts generated when magnifying the multiple micro-images in various ways, and select one of the multiple micro-images according to the degree of a slope of the display device or the portable terminal.

2. Description of Related Art

As portable terminals are becoming smaller and lighter in size and weight, display panels of the portable terminals are also becoming smaller, and optical engines which have been conventionally provided in the display panels are either removed or significantly reduced in size and weight. However, a complicated and heavy optical device is still required to magnify images provided from micro-display panels without any image distortion.

FIG. 1 is a view illustrating a conventional display device for displaying magnified images. The display device includes a light source 12, a concave mirror 16, and a liquid crystal display 14. An image or text output to the liquid crystal display 14 is magnified using the concave mirror 16. Light beams emitted from the liquid crystal display 14 form an image magnified by the curved surface of the concave mirror 16. However, since the conventional display device can magnify only one micro-image output to one display panel, there is a problem in that the corners of the magnified image are often distorted.

FIG. 2 is a block diagram illustrating a conventional function-setting device using motion of a terminal. If a user handles the terminal with a certain motion, a motion detecting unit 23 generates and outputs a corresponding geomagnetic signal and acceleration signal to MSM 24, and the MSM 24 then compares the signals with motion-setting data pre-stored in a memory 25 by the user. From the comparison, if it is determined that the signals coincide with the motion-setting data stored in the memory unit 25, the terminal performs an operation according to the motion-setting data. However, the conventional function-setting apparatus as described above has a problem in that in order to perform the intended function, the motion-setting data should be pre-stored by the user, and the user should handle the terminal with a motion that coincides with the stored data. There is a further problem in that the user cannot select and magnify one of multiple micro-images being simultaneously displayed on a display 26.

BRIEF SUMMARY

An Aspect of the present invention provides a method of displaying, selecting and magnifying multiple micro-images, and a display device and portable terminal using the same, which can output the multiple micro-images to multiple display panels, select and magnify one of the multiple micro-images selected by a user to display the magnified image.

According to an aspect of the present invention, there is provided a display device for displaying, selecting and magnifying multiple micro-images. The display device includes: a concave reflector having a radius of curvature and a focal distance; multiple display panels, arranged within the focal distance, displaying the multiple micro-images toward the concave reflector; and a corner-image interrupter, interposed between the multiple display panels and the concave reflector, interrupting a distorted portion of a magnified image generated when one of the micro-images displayed on a display panel is reflected by corners of the concave reflector.

According to another aspect of the present invention, there is provided a portable terminal for displaying, selecting and magnifying multiple micro-images. The portable terminal includes: a control unit for controlling displaying of the multiple micro-images or magnifying and displaying of one of the multiple micro-images on a selected display panel; and a display unit for displaying the multiple micro-images or for magnifying and displaying one of the multiple micro-images on the selected display panel under a control of the control unit.

The display unit may be installed in a front of or on a side of the portable terminal, and provides a zoom function.

According to still another aspect of the present invention, there is provided a method of displaying, selecting and magnifying multiple micro-images. The method includes: outputting the multiple micro-images from respective ones of multiple display panels; and magnifying and displaying the output multiple micro-images using a concave reflector.

The method further includes determining whether the magnified and displayed image is distorted; determining whether a slope value of a portable terminal exists; measuring, if the slope value of the portable terminal exists, the slope value and making only the image of the display panel selected by a user to be in an on-state and making the images of the remaining display panels to be in an off-state according to the results of the slope value measurement; and magnifying and outputting the on-state image according to information on a value obtained from the slope value measurement.

According to another embodiment of the present invention, there is provided a device including: a concave reflector having a focal distance and magnifying images reflected therefrom; multiple display panels arranged within the focal distance, each display panel displaying a micro-image toward the concave reflector to be magnified by the concave reflector; and a corner-image interrupter between the multiple display panels and the concave reflector, blocking a distorted portion of a magnified image generated when one of the micro-images displayed on a display panel is reflected by an edge of the concave reflector.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
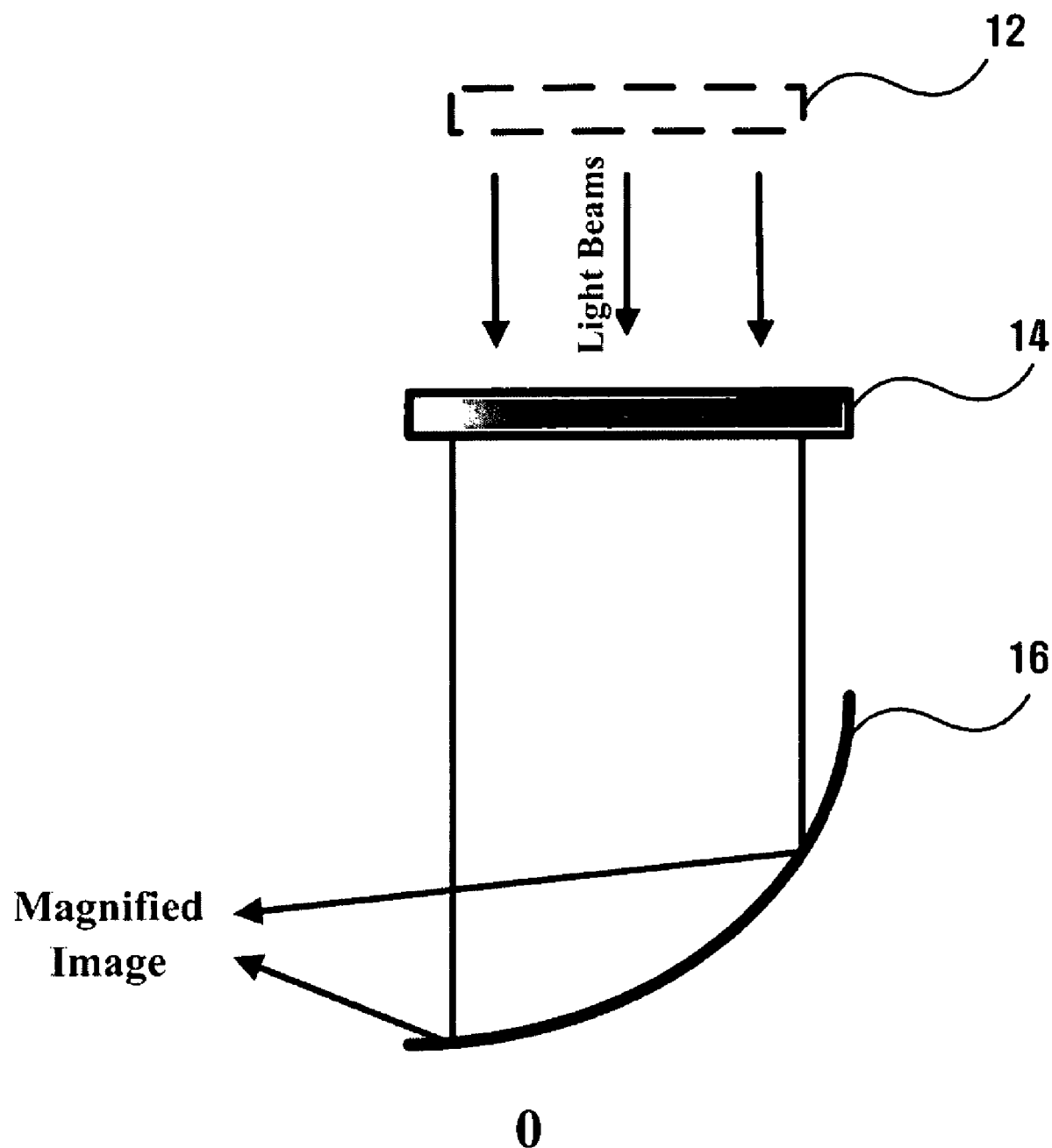
FIG. 1 is a view illustrating a conventional display device for displaying a magnified image.
Figure 2:
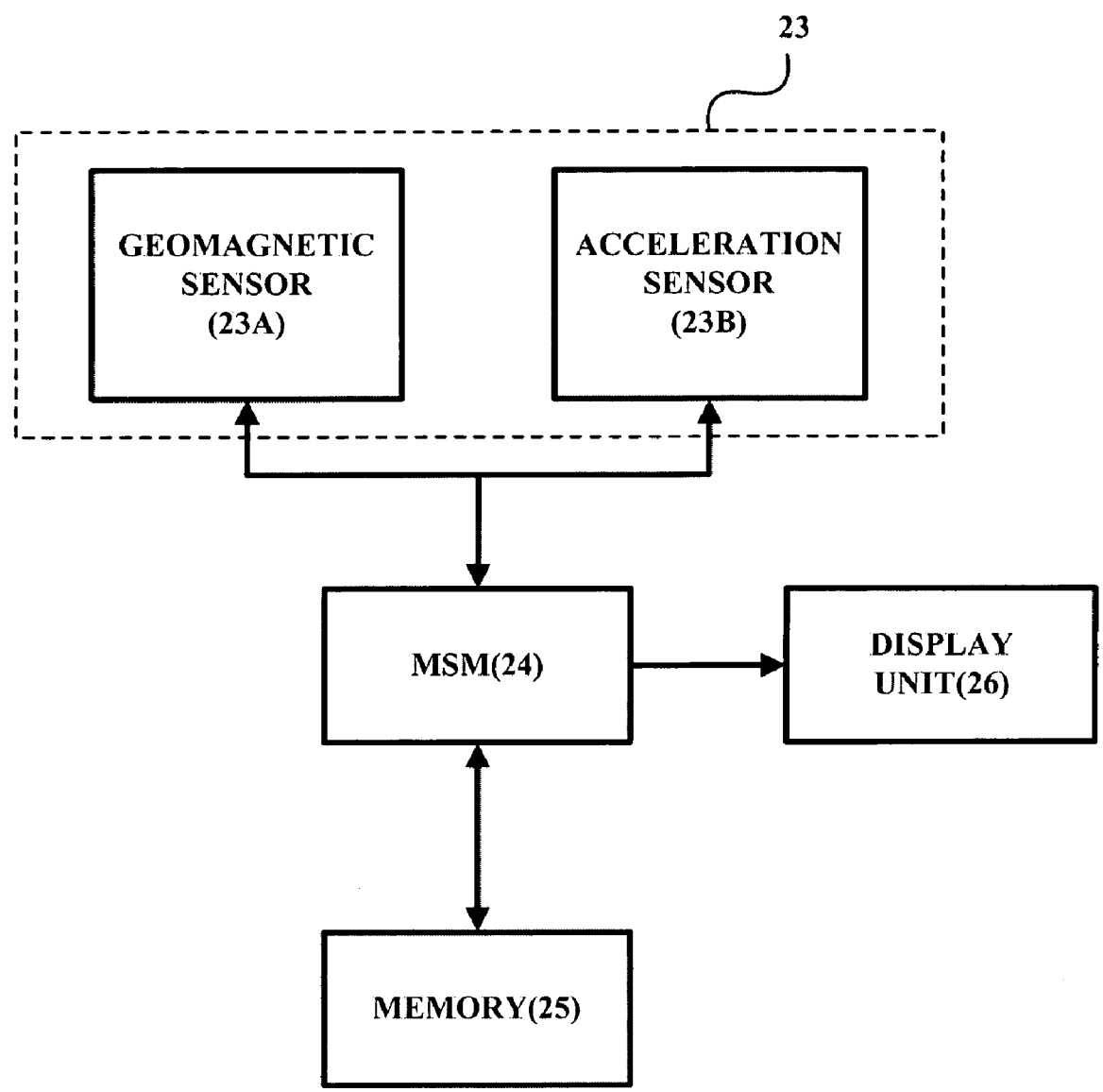
FIG. 2 is a block diagram illustrating a conventional function-setting apparatus by using motion of a terminal.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
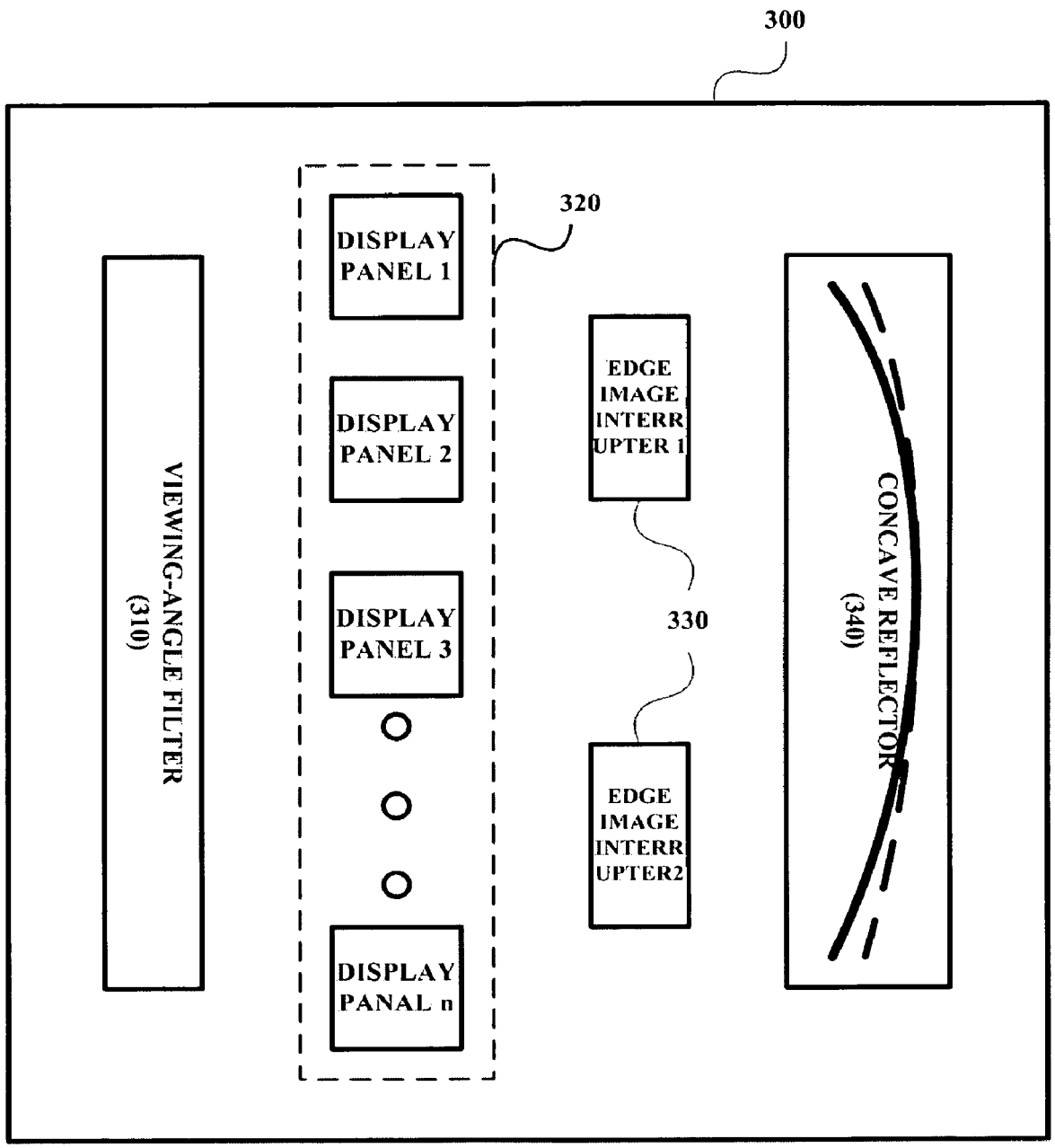
FIG. 3 is a view illustrating a display device for displaying, selecting and magnifying multiple micro-images and a portable terminal having the display device, according to an embodiment of the present invention.

FIG. 3 is a view illustrating a display device for displaying, selecting and magnifying multiple micro-images usable in, for example, a portable terminal having the display device, according to an embodiment of the present invention. Referring to FIG. 3, the display device 300 includes a viewing-angle filter 310, multiple display panels 320, a corner-image interrupter 330, and a concave reflector 340. The portable terminal includes a display unit 300 as the display device, a control unit 350, and a slope-measurement module 360.

The multiple display panels 320 display the micro-images in a direction opposite to the panel of a typical liquid crystal display. Specifically, the multiple display panels display the images towards the concave reflector 340 within a focal distance of the concave reflector, thereby forming a magnified erect virtual image at the rear of the concave reflector 340. Although n panels are shown in a line in FIG. 3, the panels may not be arranged in line. For example, four display panels of a left-right and up-down symmetric structure may be configured in view of the possibility and effectiveness of implementation in a state where the display panels are spaced apart from the viewing-angle filter 310 for a constant vertical distance. FIGS. 5B and 5C show micro-images displayed on four panels according to an embodiment of the present invention. The micro-images output by the multiple display panels are magnified to obtain an erect virtual image by the concave reflector 340 having a predetermined radius of curvature, so that a user can view the image. In this case, since the virtual image on both corners of the concave reflector 340 is significantly distorted, it is necessary to interrupt the images on the corners. Therefore, the corner-image interrupter 330 is interposed between the multiple display panels 320 and the concave reflector 340, and interrupts (i.e., blocks) the portion of the images distorted and magnified by both corners of the concave reflector 340. The corner-image interrupter 330 may be made of a material capable of interrupting light, and the operation of the corner-image interrupter is controlled by the control unit 350.

In order to eliminate the distorted portion of the image magnified by the concave reflector 340 before it is displayed the user, the viewing-angle filter 310 may be further provided in front of the multiple display panels 320. The viewing-angle filter 310 filters the distortion of the magnified images by varying its gap. The viewing-angle filter 310 has the same construction as that of a conventional filter, and the gap is varied by the control of the control unit 350.

The control unit 350 controls the display device to display the multiple micro-images or to magnify and display one micro-image from the multiple micro-images on the selected display panel. Further, if the magnified image is distorted, the control unit 350 operates to output a distortion-compensated image by extracting distortion information and changing the radius of curvature of the concave reflector 340, adjusting the position of the corner-image interrupter 330 or multiple display panels 320, or varying the gap of the viewing-angle filter 310.

The slope-measurement module 360 measures a slope value (an angle of orientation) of the portable terminal. The information on the measured slope value is output to the control unit 350, so that the image of the selected display panel is set to an on-state and the images of the remaining display panels are set to an off-state based on the measured slope value. The control unit 350 outputs the on-state image to the selected display panel and the remaining images, which are in the off-state, are not output to the remaining panels. Therefore, only the on-state image is continuously magnified by the concave reflector 340 and passes through the viewing-angle filter 310 to be viewed by the user. The slope-measurement module 360 may be implemented separately from the display unit 300, as shown in FIG. 3, may be built in the display unit 300, or may be implemented by using the construction of a typical sensor.

Figure 4:
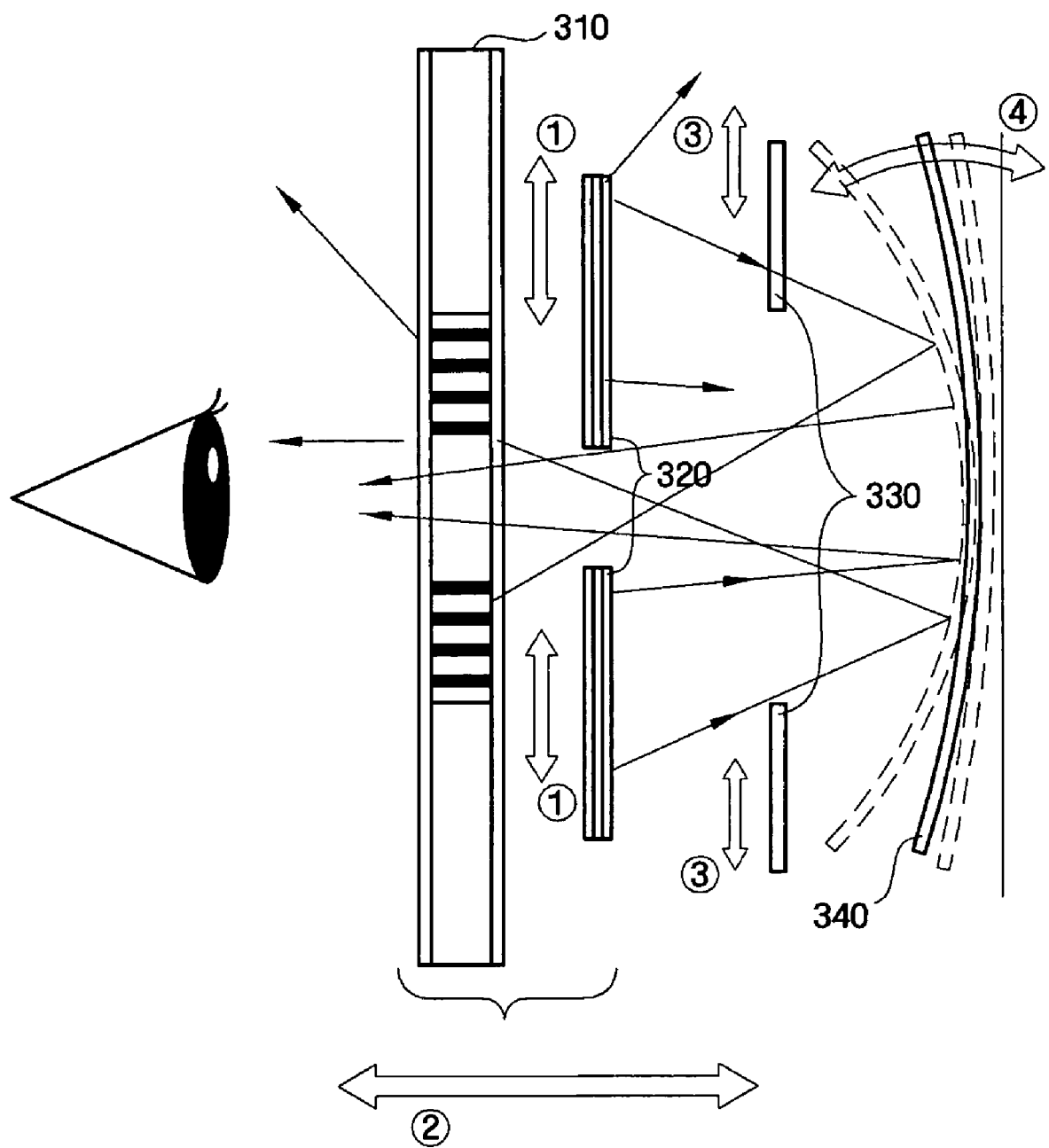
FIG. 4 is a view explaining a process of preventing distortion of a magnified image according to an embodiment of the present invention.

FIG. 4 is a view illustrating a process of preventing distortion of the magnified image according to an embodiment of the present invention.

There are number of methods of adjusting the distorted image. First, the multiple display panels 320 are tilted or panned as the vertical distance between the multiple display panels 320 and the viewing-angle filter 310 is kept constant (method 1). The corner-image interrupter 330 is tilted or panned as the vertical distance between the corner-image interrupter 330 and the multiple display panels 320 is kept constant (method 2). The position and size of the virtual image may be varied by adjusting the distance between the multiple display panels 320 and the viewing-angle filter 310 to compensate for the distortion of the image (method 3). Lastly, the radius of curvature of the concave reflector 340 is controlled by the control unit 350 to adjust the magnifying ratio of the virtual image and to compensate for the distortion as well (method 4).

Figure 5A:
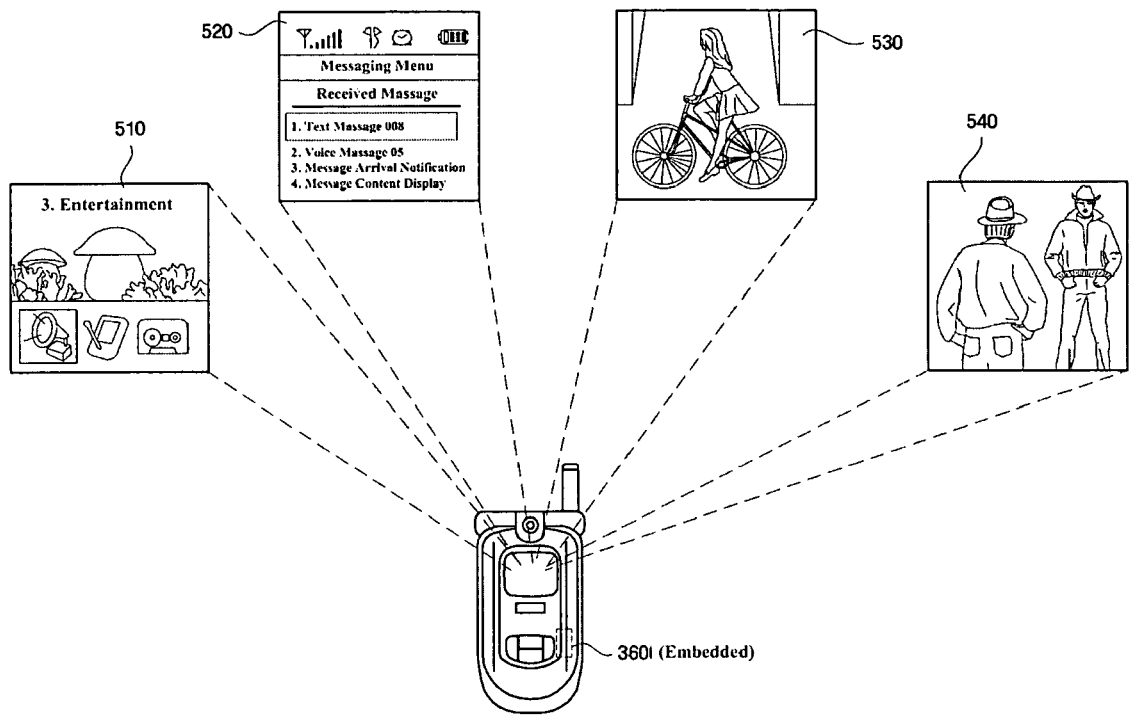
FIGS. 5A, 5B, 5C, and 5D are views explaining a method of displaying, selecting and magnifying multiple images according to an embodiment of the present invention.
Figure 5B:
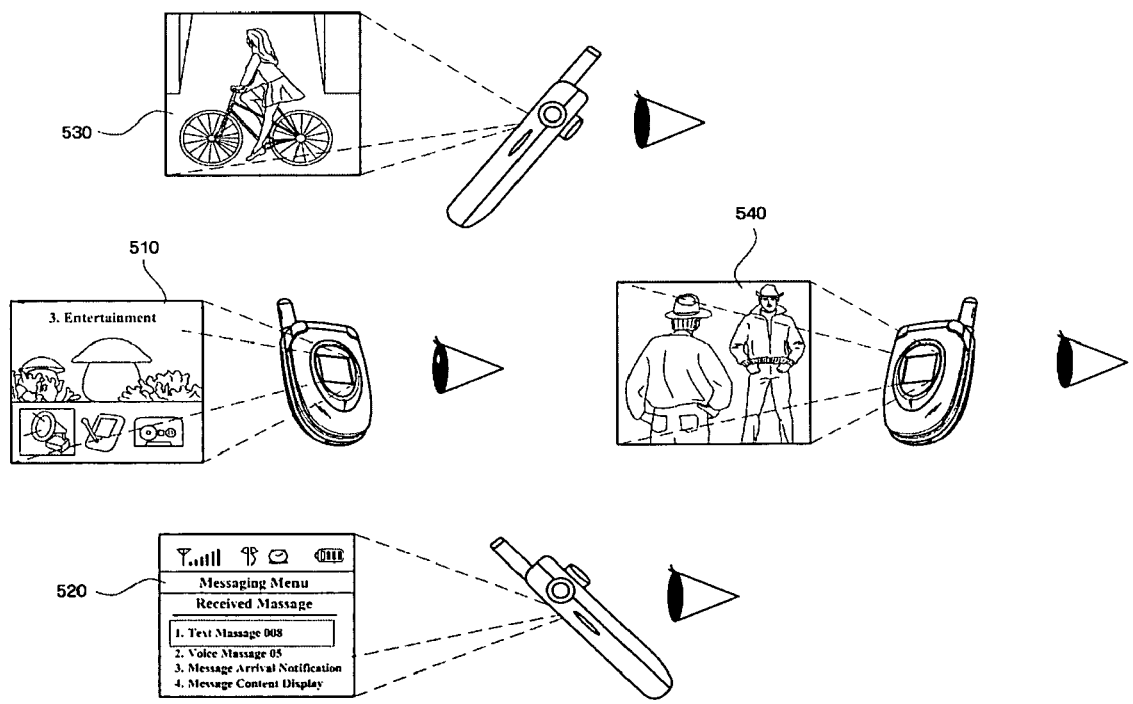
Figure 5C:
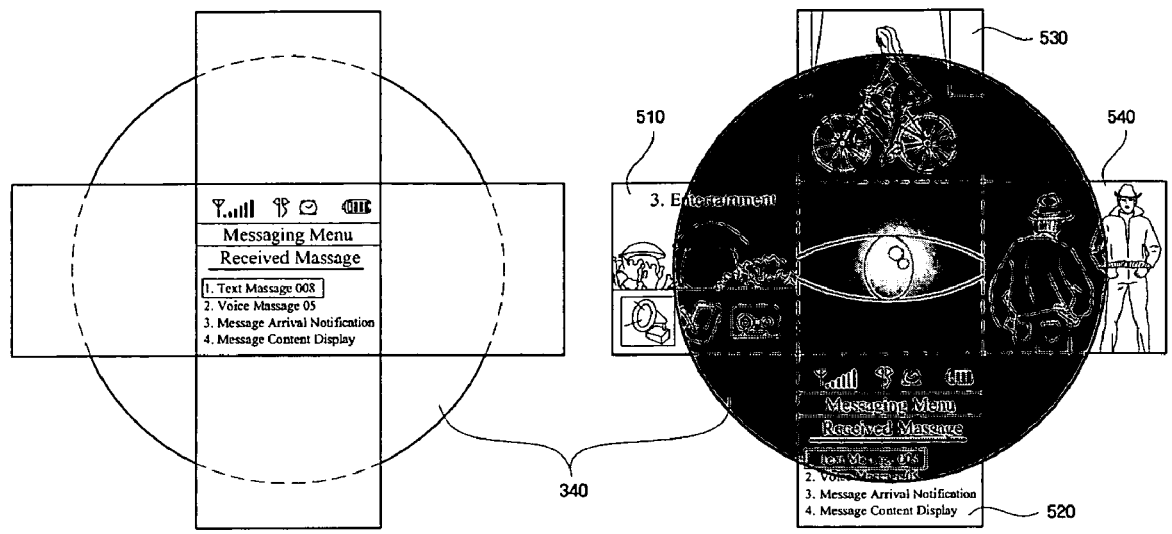

FIGS. 5A, 5B, 5C, and 5D are views illustrating a method of magnifying, displaying, and selecting multiple images according to an embodiment of the present invention. As shown in FIG. 5A, four micro-images are output to the display unit 300. For example, if an image for a main menu 510, an image for a massage management 520, and images for a photograph and a moving image 530 and 540 are simultaneously output, the user can select and magnify one of the images. FIG. 5B shows a process of selecting an image by a user, whereby the user can select one micro-image according to the viewing angle and slope of a portable terminal. For example, if a folder is closed, the image 530 is shown when viewing from an upper side of the terminal, the image 520 is shown when viewing from a lower side of the terminal, the image 510 is shown when viewing from a right side of the terminal, and the image 540 is shown when viewing from a left side of the terminal. The slope-measurement module 360 built in the portable terminal measures a slope value of the terminal, and only the specified image selected by the user is magnified and output according to the results of measurement. FIG. 5C is a cross-sectional view of the display unit 300. In FIG. 5C, a right figure is a cross-sectional view when viewing from a rear side of the concave reflector 340 and a left figure is a cross-sectional view when viewing from a front side of the concave reflector 340. FIG. 5C shows the image 520 selected from the images respectively output to four display panels 320.

Figure 5D:
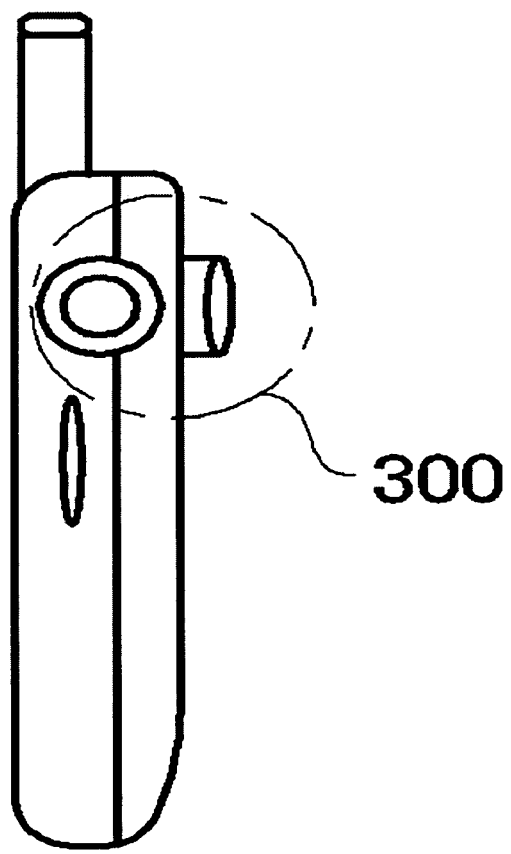

FIG. 5D shows a zoom function of the display unit 300 installed in front of or on the side of the portable terminal. The display unit 300 is generally installed in front of the portable terminal, but if the focal distance of the concave reflector 340 is long, it may be installed on the side of the portable terminal. Specifically, FIG. 5D shows that the display unit 300 is selectively installed in front of or on the side of the portable terminal. The problem in appearance may occur in the case where the display unit 300 somewhat protrudes from the portable terminal. This can be solved by adding a zoom-in/zoom-out function to the terminal.

Figure 6:
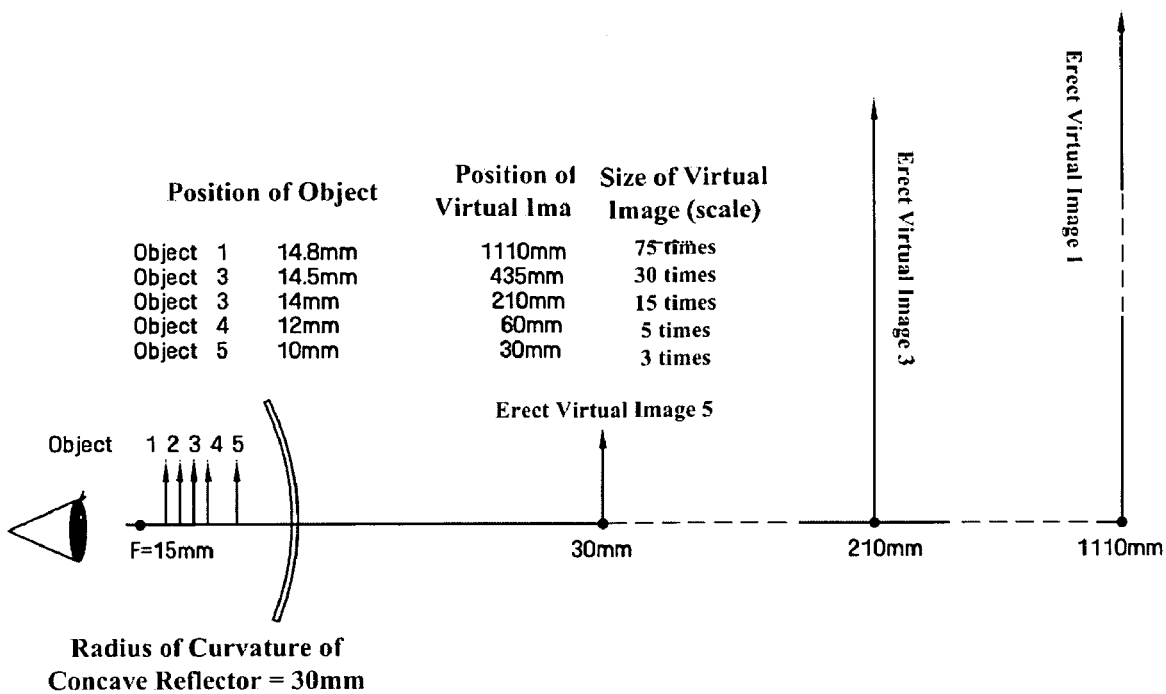
FIG. 6 is a view depicting experimental data of a magnifying ratio of micro-images according to an embodiment of the present invention.

FIG. 6 shows experimental data of the magnifying ratio of the micro-images according to an embodiment of the present invention. The radius of curvature of the concave reflector 340 is 30 mm, and the focal distance is half the radius of curvature, i.e., 15 mm. Hence, the experimental data is obtained by an equation, (1/position of object)−(1/position of virtual image)=(1/focal distance), to produce the results as shown in FIG. 6.

Referring to FIG. 6, as an object moves closer to the concave reflector 340 from a focal point, the magnifying ratio of the erect virtual image is decreased, while as the object moves to closer to the focal point, the magnifying ratio is increased.

Figure 7:
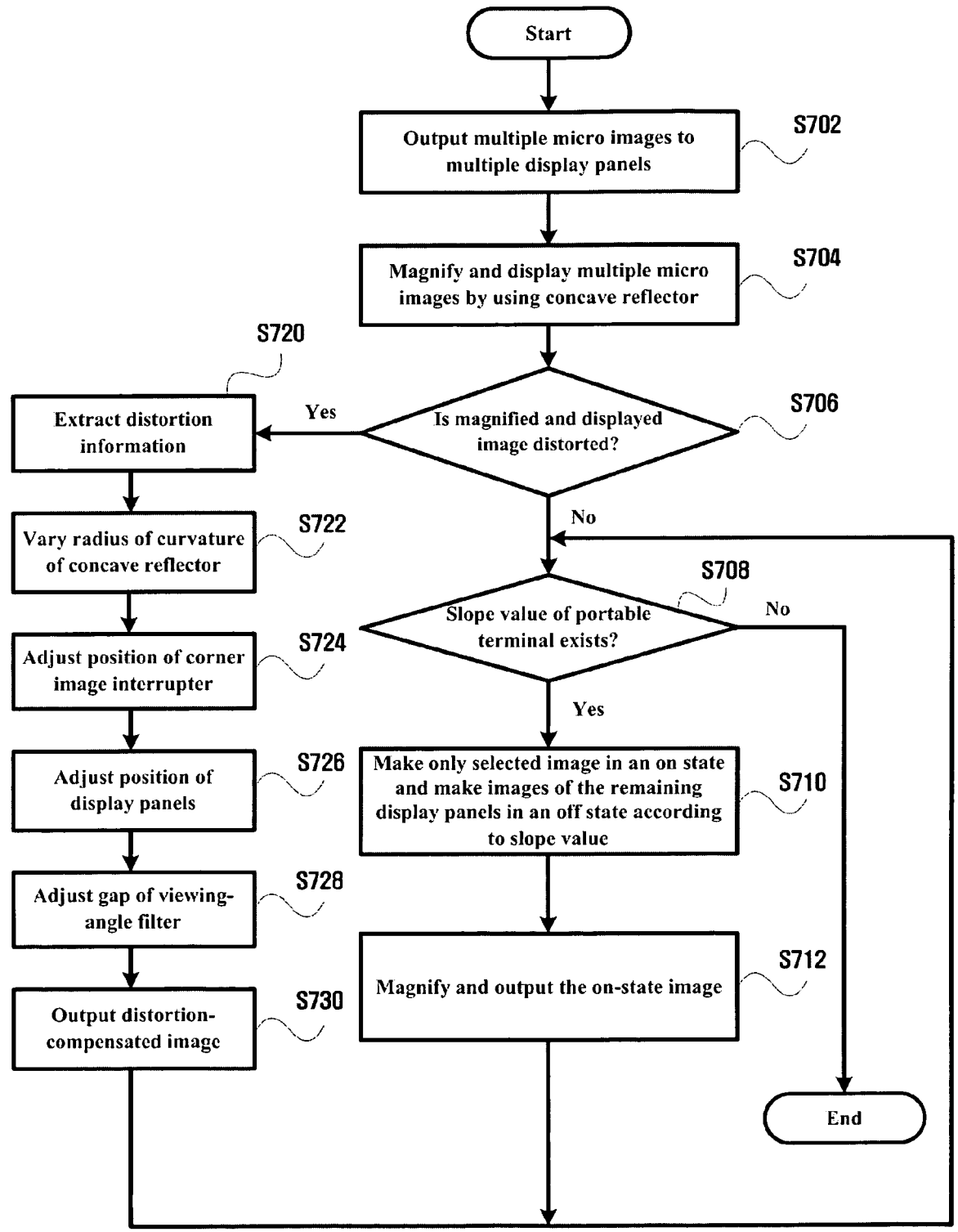
FIG. 7 is a flowchart illustrating a process of displaying, selecting and magnifying multiple micro-images according to an embodiment of the present invention.

FIG. 7 is a flowchart illustrating a method of displaying, selecting and magnifying the multiple micro-images according to an embodiment of the present invention.

Referring to FIGS. 3 and 7, first, the multiple micro-images are output to the multiple display panels, respectively S702, and the output micro-images are magnified and output by the concave reflector 340 S704. In this case, the control unit 350 determines whether the magnified image is distorted S706. If the image is not distorted, the control unit 350 determines whether a slope value of the portable terminal exists S708. If the slope value of the portable terminal exists, it is measured. The information on the measured slope value is output to the control unit 350, and according to the measured slope value, only the image on the selected display panel is set to an on-state, and the images on the remaining display panels are set to an off-state S710. The control unit 350 magnifies and outputs only the image in an on-state S712.

If the magnified image is distorted, the control unit 350 extracts the distortion information S720 to take various compensating measures. Specifically, the radius of curvature of the concave reflector 340 may be varied S722, or the corner-image interrupter 330 may be tilted or panned as the vertical distance between the corner-image interrupter 330 and the display panels is kept constant S724. Also, the multiple display panels 320 may be tilted or panned as the vertical distance between the multiple display panels 320 and the viewing-angle filter 310 is kept constant S726. Also, the gap of the viewing-angle filter 310 may be varied S728.

If the distortion-compensated image as above is magnified and output S730, step S708 is performed again to determine whether the slope value for selecting the image exists. Hence, only the image selected according to the slope value is in an on-state, and thus the user can clearly view the magnified image.

According to the above-described embodiments of the present invention, the portable terminal includes the multiple display panels for outputting multiple micro-images, and thus the number of displayed micro-images can be increased to provide more selections on the user interface (UI) of the portable terminal.

In addition, when one of the micro-images is selected by a user, only the selected image is in an on-state at the viewing angle and the slope of the display device, while the remaining images are in an off-state, and the selected image is magnified by the concave reflector to be viewed by the user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A display device for displaying, selecting and magnifying multiple micro-images, the display device comprising:
   a concave reflector having a radius of curvature and a focal distance;
   multiple display panels, arranged within the focal distance, displaying the multiple micro-images toward the concave reflector;
   a corner-image interrupter, interposed between the multiple display panels and the concave reflector, interrupting a distorted portion of a magnified image generated when one of the micro-images displayed on a display panel is reflected by corners of the concave reflector;
   a controller controlling the display device to display the multiple micro-images or to magnify and display one of the micro-images from a selected display panel; and
   a slope-measurement module measuring a slope value of the display device, the slope value being used by the controller to turn on a selected one of the multiple display panels and to turn off the remaining display panels so that only the image from the display panel in the on-state is magnified by the concave reflector.

2. The display device as claimed in claim 1, further comprising a viewing-angle filter in front of the multiple display panels, having a variable gap, and filters distortion of the micro-image magnified by the concave reflector before the image is displayed.

3. The display device as claimed in claim 1, wherein the multiple display panels include four display panels arranged in a left-right and up-down symmetric structure.

4. The display device as claimed in claim 1, wherein the radius of curvature of the concave reflector is variable.

5. The display device as claimed in claim 1, wherein the corner-image interrupter is tilted or panned while a constant vertical distance between the corner-image interrupter and the display panels is maintained.

6. The display device as claimed in claim 2, wherein the display panels are tilted or panned while a constant vertical distance between the display panels and the viewing-angle filter is maintained.

7. The display device as claimed in claim 2, wherein a distance between the multiple display panels and the viewing-angle filter is variable.

8. A portable terminal for displaying, selecting and magnifying multiple micro-images, the portable terminal comprising:

a control unit controlling display of the multiple micro-images or controlling to magnify and display a select one of the multiple micro-images on a selected display panel of a plurality of displays; and a display unit displaying the multiple micro-images or magnifying and displaying one of the multiple micro-images on the selected display panel under a control of the control unit, wherein the display unit includes multiple display panels displaying the multiple micro-images.

9. A portable terminal for displaying, selecting and magnifying multiple micro-images, the portable terminal comprising:

a control unit controlling display of the multiple micro-images or magnifying and displaying of one of the multiple micro-images on a selected display panel;

a display unit displaying the multiple micro-images or magnifying and displaying one of the multiple micro-images on the selected display panel under a control of the control unit; and a slope-measurement module measuring a slope value of the portable terminal and outputting measured slope value information to the control unit, wherein the control unit controls the display unit to make the micro-image on a selected display panel in an on-state and make the images on the remaining display panels in an off-state based on the measured slope value.

10. The portable terminal as claimed in claim 8, wherein the display unit includes:

a concave reflector having a radius of curvature and a focal distance;

the multiple display panels being arranged within the focal distance to display the multiple micro-images toward the concave reflector; and a corner-image interrupter, interposed between the multiple display panels and the concave reflector, interrupting a distorted portion of a magnified image generated when one of the micro-images displayed on a display panel is reflected by corners of the concave reflector.

11. The portable terminal as claimed in claim 8, wherein the display unit provides a zoom function and is installed in front of or on a side of the portable terminal.

12. A device comprising:

a concave reflector having a focal distance and magnifying images reflected therefrom;

multiple display panels arranged within the focal distance, each display panel displaying a micro-image toward the concave reflector to be magnified by the concave reflector;

a corner-image interrupter between the multiple display panels and the concave reflector, blocking a distorted portion of a magnified image generated when one of the micro-images displayed on a display panel is reflected by an edge of the concave reflector;

a controller controlling the device to display the multiple micro-images or to magnify and display one of the micro-images from a selected display panel; and a slope-measurement module measuring a slope value of the device, the slope value being used by the controller to turn on a selected one of the multiple display panels and to turn off the remaining display panels so that only the image from the display panel in the on-state is magnified by the concave reflector.

13. A device comprising:

a concave reflector having a focal distance and magnifying images reflected therefrom;

multiple display panels arranged within the focal distance, each display panel displaying a micro-image toward the concave reflector to be magnified by the concave reflector;

a corner-image interrupter between the multiple display panels and the concave reflector, blocking a distorted portion of a magnified image generated when one of the micro-images displayed on a display panel is reflected by an edge of the concave reflector;

a controller controlling the device to display the multiple micro-images or to magnify and display one of the micro-images from a selected display panel, wherein, when a magnified micro-image is distorted, the controller extracts distortion information and changes: a radius of curvature of the concave reflector: a position of the corner-image interrupter; a position of the selected display panel; or a gap of a viewing-angle filter.

* * * * *